March 21, 1939.  F. LOBL  2,151,407

BEVERAGE MAKING APPARATUS

Filed April 16, 1936

Inventor,
Frederick Lobl
by
Greenwood
atty

Patented Mar. 21, 1939

2,151,407

UNITED STATES PATENT OFFICE 2,151,407

BEVERAGE MAKING APPARATUS

Frederick Lobl, Middleboro, Mass.

Application April 16, 1936, Serial No. 74,659

3 Claims. (Cl. 53—3)

This invention relates to apparatus for making beverages, such as coffee, tea, especially in the home, by a process in which hot water is forced from a lower receptacle into an elevated receptacle containing the beverage base, as coffee grounds, by the vapor pressure of the water, and the extract liquor subsequently flows into the lower receptacle by gravity and the partial vacuum resulting from the cooling of the vapor in the lower receptacle.

The usual apparatus for making coffee by the above process is tall and thereby top-heavy, and the upper receptacle has to be removed from the lower receptacle before the beverage can be poured out of the latter.

It is an object of the present invention to provide a beverage making apparatus which is relatively short and thereby stable and not liable to be upset and wherein the upper receptacle is located, at least mainly, within the lower receptacle.

A further object is the provision of an improved beverage making apparatus wherein the upper receptacle need not be removed to enable the liquid in the lower receptacle to be poured out.

A yet further object is the provision of a beverage making apparatus wherein the lower receptacle has a pouring spout that can be closed and opened by changing the position of the upper receptacle in the lower receptacle, specifically, by rotating the upper receptacle upon the lower receptacle.

An additional object is the provision of a beverage making apparatus wherein the upper receptacle is mainly within the lower receptacle and both have cooperating annular seats by which the lower receptacle is normally sealed to permit the building up of vapor pressure when the water therein is heated, the seats having cooperating pouring spout parts which can be brought into register by rotating the upper receptacle upon its seat on the lower receptacle, thereby to open the spout to permit the pouring out of the liquid contents of the lower receptacle.

A further object is the provision of a beverage making apparatus as above described, the upper receptacle having a removable cover which is pressed upon its receptacle by the automatic action of a movable handle of the apparatus when the handle is grasped to tilt the apparatus.

A yet further object is generally to improve upon beverage making apparatus.

Figure 1:
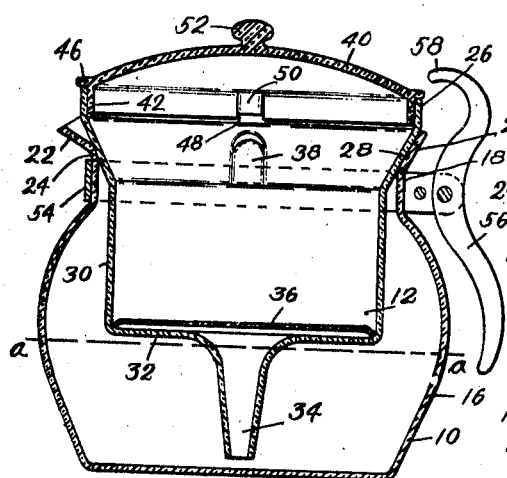
Fig. 1 is a vertical section through a beverage making apparatus embodying the present invention in the normal position of the parts for operation.

The beverage making apparatus of the present invention includes the lower receptacle 10 and the upper receptacle 12. Both receptacles are composed preferably of glass. A heat resistant glass, such as pyrex glass, is quite suitable. The lower receptacle has a broad flat bottom wall 14 which supports the entire apparatus. Said bottom wall is adapted to rest upon or over a suitable source of heat to enable the water in the receptacle to be heated sufficiently to carry out the process. The side wall 16 can be of any desired configuration.

The top part of the lower receptacle is provided with a short cylindrical neck formed by the cylindrical side wall 18. The cross section of the interior of the neck is relatively large and is here shown as having approximately the diameter of the bottom wall 14. The receptacle above the neck is provided with an outwardly flaring or conical wall 20 which forms a substantially vapor tight seat for the upper receptacle 12.

A portion of the conical wall, above its junction with the neck wall, is shaped into a pouring spout 22. The conical wall 20, however, has a seat part 24 which is between the spout and the neck, so that the upper receptacle can stop off communication between the interior of the lower receptacle and the spout.

The upper receptacle 12 is located almost entirely within the lower receptacle and depends into the top thereof. Said upper receptacle has an open top formed by a short cylindrical wall 26 the diameter of which is approximately the diameter of the top opening of the outer receptacle. Below the wall 26 there is provided a conical wall 28 which slopes inwardly and conforms to the slope of the conical wall 20 of the lower receptacle and seats in a substantially vapor tight manner thereupon. The upper receptacle thus provides a seal for the lower receptacle. If desirable, the contacting surfaces of the conical walls 20 and 28 can be ground to ensure a suitable tight engagement of the two receptacles.

The use of a glass to glass seal is preferable to a gasket, the sanitary condition of which can be questioned.

The body portion 30 of the upper receptacle, within the lower receptacle can be of any configuration suitable to pass into the lower receptacle. As herein shown the body portion 30 is cylindrical.

The upper receptacle is provided with a bottom wall 32, generally flat, from the middle of which depends a tube 34 which is open at its upper end to the interior of the upper receptacle and at its lower end to the interior of the lower receptacle. The bottom end of the tube is terminated close above the bottom wall 14 of the lower receptacle.

A suitably perforated strainer or filter 36 is seated on and spaced above the bottom wall 32 of the upper receptacle and over the top opening of the tube and is adapted to support a mass of a beverage base, as coffee grounds, tea leaves, etc.

Figure 2:
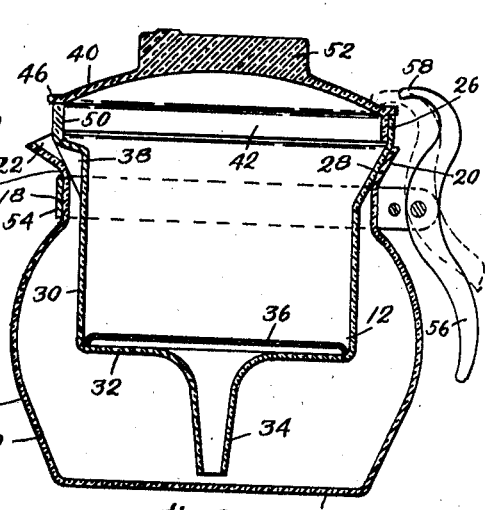
Fig. 2 is a view similar to Fig. 1 but with the upper receptacle rotated to bring the pouring spout elements of the upper and lower receptacles into register to permit pouring out the contents of the lower receptacle.
Figure 3:
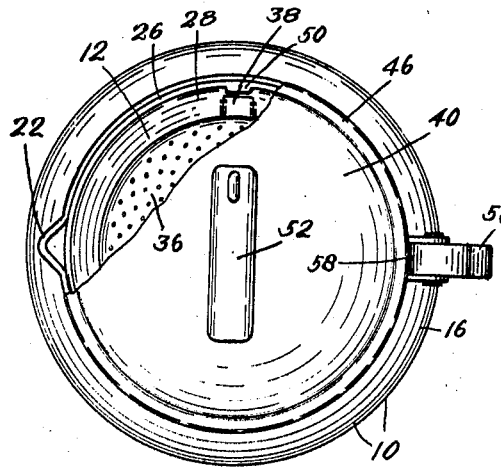
Fig. 3 is a plan view of the apparatus of Fig. 1 with the top cover partly broken away to expose the strainer.
Figure 4:
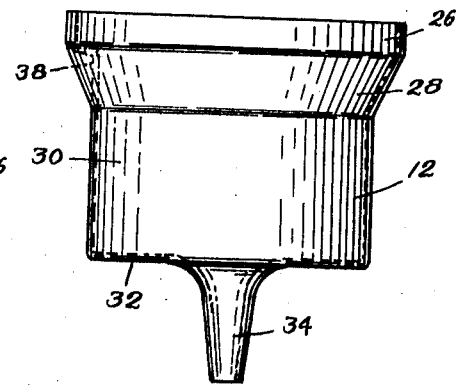
Fig. 4 is a side elevation of the upper receptacle.

The conical seat wall 28 of the upper receptacle is provided with an indented part 38 which is located entirely within the outer margin of the seat wall 28 and which can be brought into register with the spout 22 by rotating the upper receptacle on its seat from the position of Fig. 1 to the position of Fig. 2, thereby to unseal the spout and allow the liquid in the lower receptacle to be poured out through the spout. When the indented part 38 is out of register with the spout the lower receptacle is substantially sealed against escape of vapor.

The open top of the upper receptacle is provided with a removable cover 40, also preferably of glass, having an annular shoulder 42 which fits inside the neck 26 and an annular flange 46 which seats upon the top of said neck. The shoulder is provided with a notch 48 in which a lug 50 of the upper receptacle is located, thereby to secure the cover and receptacle together for conjoint rotation. The cover is provided with a handle 52 preferably in the form of a horizontal bar directed toward the indented or spout part 38 of the upper receptacle when the cover is thereon, whereby the amount and direction of rotation of the upper receptacle to open and close the spout may be readily determined.

The apparatus is provided with a metal band 54 which is clamped about the neck 15 of the lower receptacle and carries a handle 56 pivoted thereto. Said handle has an upper cover engaging part 58 which is located above the cover 40 and is swung automatically downwardly into engagement with the cover when the handle is raised to tilt the apparatus, thereby to hold the cover on the upper receptacle when the apparatus is tilted.

In use the lower receptacle will be filled with water to some suitable level a—a that is below the strainer 36. The water is heated and when the water is about at or close to the boiling point sufficient vapor is generated, and the air above the water also becomes heated, to create a pressure in the vapor space above the water. This space is sealed by the upper receptacle against escape of the pressure vapor and hence the pressure forces the heated water upwardly through the tube 34 into the upper receptacle and into contact with the beverage base, as coffee grounds, on and above the strainer. The heat is then removed from the lower receptacle and the vapor therein condenses, and may create a partial vacuum, thereby drawing back down into the lower receptacle the liquid in the upper receptacle. The cover 40 of the upper receptacle is loose fitting and does not make an air tight seal therewith. The beverage can then be poured out of the lower receptacle by rotating the upper receptacle to open the pouring spout.

The liquid capacity of the upper receptacle below its seat 28 approximates that of the lower receptacle below the upper receptacle.

I claim:

1. Beverage making apparatus comprising a lower receptacle, an upper open top receptacle located mainly within said lower receptacle, a tube opening into the bottom part of said upper receptacle and terminated close above the bottom of said lower receptacle, a removable cover for the open top of said upper receptacle, and a handle for said apparatus having a pivotal connection with said lower receptacle and a part automatically movable upon said cover by the pivoting of said handle, whereby to hold said cover upon said upper receptacle upon the tilting of the apparatus by said handle.

2. Beverage making apparatus of the pressure-vacuum type comprising a lower glass receptacle having a conical open top and an annular seat adjacent said top, an upper glass receptacle removably located practically entirely within said lower receptacle, above the bottom and in the open top thereof, said upper receptacle having an open top and a conical annular seat adjacent its top which is seated upon the seat of and seals said lower receptacle, said lower receptacle being free from all openings except said top opening, said upper receptacle having a tube projected downwardly from the bottom thereof and terminated close above the bottom of said lower receptacle, a strainer in said upper receptacle over the upper end of said tube, the arrangement being such that vapor pressure differences in said lower receptacle cause the liquid therein to pass through said tube into and out of said upper receptacle, and a pouring spout for the liquid in said lower receptacle having cooperating parts carried by both receptacles, said upper receptacle being angularly shiftable in opposite directions upon its seat on said lower receptacle to control registration of said spout parts, whereby to open and close said spout.

3. Apparatus as in claim 2, wherein the upper receptacle has an open top, and a removable cover is provided therefor having an interlocking connection with the upper receptacle, and means for rotating the cover and upper receptacle together to open and close said spout.

FREDERICK LOBL.